US012795489B2

(12) United States Patent
Mavureddi Dhanasekaran et al.

(10) Patent No.: US 12,795,489 B2
(45) Date of Patent: Nov. 10, 2026

(54) SWITCH OVER WITHOUT DISCONNECTION OF ACCESS NETWORK

(71) Applicant: Nokia Technologies Oy, Espoo (FI)

(72) Inventors: Ranganathan Mavureddi Dhanasekaran, Munich (DE); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 496 days.

(21) Appl. No.: 18/336,442

(22) Filed: Jun. 16, 2023

(65) Prior Publication Data

US 2023/0413145 A1 Dec. 21, 2023

(30) Foreign Application Priority Data

Jun. 20, 2022 (IN) ............................ 202241035291

(51) Int. Cl.

| | |
|---|---|
| ***H04W 36/18*** | (2009.01) |
| ***H04W 12/0431*** | (2021.01) |
| ***H04W 12/06*** | (2021.01) |
| ***H04W 36/22*** | (2009.01) |
| ***H04W 84/12*** | (2009.01) |

(52) U.S. Cl.

CPC ..... *H04W 36/185* (2023.05); *H04W 12/0431* (2021.01); *H04W 12/06* (2013.01); *H04W 36/22* (2013.01); *H04W 84/12* (2013.01)

(58) Field of Classification Search

CPC ............... H04W 12/06; H04W 36/185; H04W 12/0431; H04W 36/22; H04W 84/12

See application file for complete search history.

(56) References Cited

U.S. PATENT DOCUMENTS

2021/0409934 A1* 12/2021 Tiwari .................... H04W 8/24
2023/0044847 A1* 2/2023 Palanigounder ...... H04W 12/06
2023/0292109 A1* 9/2023 Chuang .................. H04W 8/26
2024/0251239 A1* 7/2024 Gupta .................. H04W 12/72

FOREIGN PATENT DOCUMENTS

WO 2023/198297 A1 10/2023

OTHER PUBLICATIONS

Partial European Search Report received for corresponding European Patent Application No. 23177920.8, dated Nov. 27, 2023, 15 pages.

(Continued)

*Primary Examiner* — Margaret G Webb
(74) *Attorney, Agent, or Firm* — Barta Jones, PLLC

(57) ABSTRACT

Example embodiments of the present disclosure relate to switching over without disconnection of access network. In an example method, a core network device receives a sensing request from a terminal device. The first apparatus receives an internal indication of the switchover from a second apparatus of the terminal device separable from the first apparatus; switches from a first context associated with the first traffic to a second context associated with the second traffic; and sends a response to the second apparatus of the terminal device to indicate that the switching is completed. In this way, the first apparatus of the terminal device can switch from the first context to the second context, without disconnection with the access network, and without interrupt of the service.

12 Claims, 7 Drawing Sheets

(56) References Cited

OTHER PUBLICATIONS

"NSWO NAI corrections", 3GPP TSG-CT WG1 Meeting #136-e, C1-224257, Nokia, May 12-20, 2022, 3 pages.
Extended European Search Report received for corresponding European Patent Application No. 23177920.8, dated Mar. 6, 2024, 19 pages.
"NSWO and N3GPP access support", 3GPP TSG-WG SA2 Meeting #150E e-meeting, S2-2202655, Agenda Item: 8.28, Huawei, Apr. 6-12, 2022, pp. 1-9.
"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.
"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.
"3rd Generation Partnership Project; Technical Specification Group Core Network and Terminals; Circuit switched data bearer services (Release 17)", 3GPP TS 23.202, V17.0.0, Mar. 2022, pp. 1-15.
"5G registration via trusted non-3GPP access after NSWO authentication", 3GPP TSG-SA3 Meeting #107-e, S3-221068, Agenda Item: 6, Lenovo, May 16-20, 2022, 3 pages.
"IEEE 802.11", Wikipedia, Retrieved on Jul. 21, 2023, Webpage available at : https://en.wikipedia.org/wiki/IEEE_802.11.
"3rd Generation Partnership Project; Technical Specification Group Services and System Aspects; Security architecture and procedures for 5G system (Release 17)", 3GPP TS 33.501, V17.5.0, Mar. 2022, pp. 1-293.

* cited by examiner

SWITCH OVER WITHOUT DISCONNECTION OF ACCESS NETWORK

FIELD

Example embodiments of the present disclosure generally relate to the field of telecommunication, and in particular, to a terminal device, a set of access network devices, a set of core network device, methods, apparatuses and a computer readable storage medium for switching over without disconnection of access network.

BACKGROUND

Non-seamless wireless local area network (WLAN) offload (NSWO) is based on the principle that a terminal device connects to a WLAN network and authenticates with an authentication procedure with an Authentication Server Function (AUSF) via a NSWO network function (NSWOF). After the successful authentication, the terminal device is not registered in the 3GPP network at this point in time and has no Non-Access Stratum (NAS) or user plane connectivity to the 5G core network (5GC). However, if the terminal device needs to perform a 5G registration via this WLAN at a later time, such registration and access procedures of the terminal device may need to be optimized.

SUMMARY

In general, example embodiments of the present disclosure provide a solution for switching over without disconnection of access network.

In a first aspect, there is provided a first apparatus of a terminal device. The first apparatus of a terminal device comprises at least one processor; and at least one memory including computer program codes; the at least one memory and the computer program codes being configured to, with the at least one processor, cause the first apparatus to: receive an internal indication of the switchover from a second apparatus of the terminal device separable from the first apparatus; switch from a first context associated with the first traffic to a second context associated with the second traffic; and send a response to the second apparatus of the terminal device to indicate that the switching is completed.

In a second aspect, there is provided a second apparatus of a terminal device. The second apparatus of a terminal device comprises at least one processor; and at least one memory including computer program codes. The processor is configured to cause the second apparatus to: determine a switchover from a first traffic associated with a first access point to a second traffic associated with a second access point; transmit an indication of the switchover to the first access point, the indication being protected by a first key for a first connection between the terminal device and the first access point; and establish a second connection between the terminal device and the second access point, the second connection being protected by a second key.

In a third aspect, there is provided a first access point. The first access point comprising: a processor; and a transceiver communicatively coupled to the processor. The processor is configured to cause the first access point to: receive, from a terminal device, a first indication protected by a first key for a connection between the terminal device and the first access point; decrypt the first indication based on the first key to determine a switchover by the terminal device from a first traffic associated with the first access point to a second traffic associated with a second access point; and transmit a second indication of the switchover to the second access point.

In a fourth aspect, there is provided a second access point. The second access point comprising: a processor; and a transceiver communicatively coupled to the processor. The processor is configured to cause the second access point to: receive, from a first access point, an indication of a switchover by a terminal device from a first traffic associated with the first access point to a second traffic associated with the second access point, a first connection between the terminal device and the first access point being protected by a first key; and establish a second connection between the terminal device and the second access point, the second connection being protected by a second key.

In a fifth aspect, there is provided a method performed by a first apparatus of a terminal device. The method comprises: receiving an internal indication of the switchover from a second apparatus of the terminal device; and switching, from a first context associated with the first traffic to a second context associated with the second traffic; and sending, a response to the second apparatus of the terminal device to indicate that the switching is completed.

In a sixth aspect, there is provided a method performed by a second apparatus of a terminal device. The method comprises: determining a switchover from a first traffic associated with a first access point to a second traffic associated with a second access point; transmitting, an indication of the switchover to the first access point, the indication being protected by a first key for a first connection between the terminal device and the first access point; and establishing a second connection between the terminal device and the second access point, the second connection being protected by a second key.

In a seventh aspect, there is provided a method performed by a first access point. The method comprises: receiving a first indication protected by a first key for a connection between the terminal device and the first access point; decrypting the first indication based on the first key to determine a switchover by the terminal device from a first traffic associated with the first access point to a second traffic associated with a second access point; and transmitting a second indication of switchover to the second access point.

In an eighth aspect, there is provided a method performed by a second access point. The method comprises: receiving an indication of a switchover by a terminal device from a first traffic associated with the first access point to a second traffic associated with the second access point, a first connection between the terminal device and the first access point being protected by a first key; and establishing a second connection between the terminal device and the second access point, the second connection being protected by a second key.

In a ninth aspect, there is provided an apparatus. The apparatus comprising: means for receiving, at a first apparatus of a terminal device, an internal indication of the switchover from a second apparatus of the terminal device; and means for switching, from a first context associated with the first traffic to a second context associated with the second traffic; and means for sending, a response to the second apparatus of the terminal device to indicate that the switching is completed.

In a tenth aspect, there is provided an apparatus. The apparatus comprising: means for determining, at a second apparatus of a terminal device, a switchover from a first traffic associated with a first access point to a second traffic associated with a second access point; means for transmitting, an indication of the switchover to the first access point, the indication being protected by a first key for a first connection between the terminal device and the first access point; and means for establishing a second connection between the terminal device and the second access point, the second connection being protected by a second key.

In an eleventh aspect, there is provided an apparatus. The apparatus comprising: means for receiving, at a first access point from a terminal device, a first indication protected by a first key for a connection between the terminal device and the first access point; means for decrypting the first indication based on the first key to determine a switchover by the terminal device from a first traffic associated with the first access point to a second traffic associated with a second access point; and means for transmitting a second indication of switchover to the second access point.

In a twelfth aspect, there is provided an apparatus. The apparatus comprising: means for receiving, at a second access point from a first access point, an indication of a switchover by a terminal device from a first traffic associated with the first access point to a second traffic associated with the second access point, a first connection between the terminal device and the first access point being protected by a first key; and means for establishing a second connection between the terminal device and the second access point, the second connection being protected by a second key.

In a thirteenth aspect, there is provided a non-transitory computer readable medium comprising program instructions for causing an apparatus to perform at least the method in the fifth, sixth, seventh, and eighth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1A:
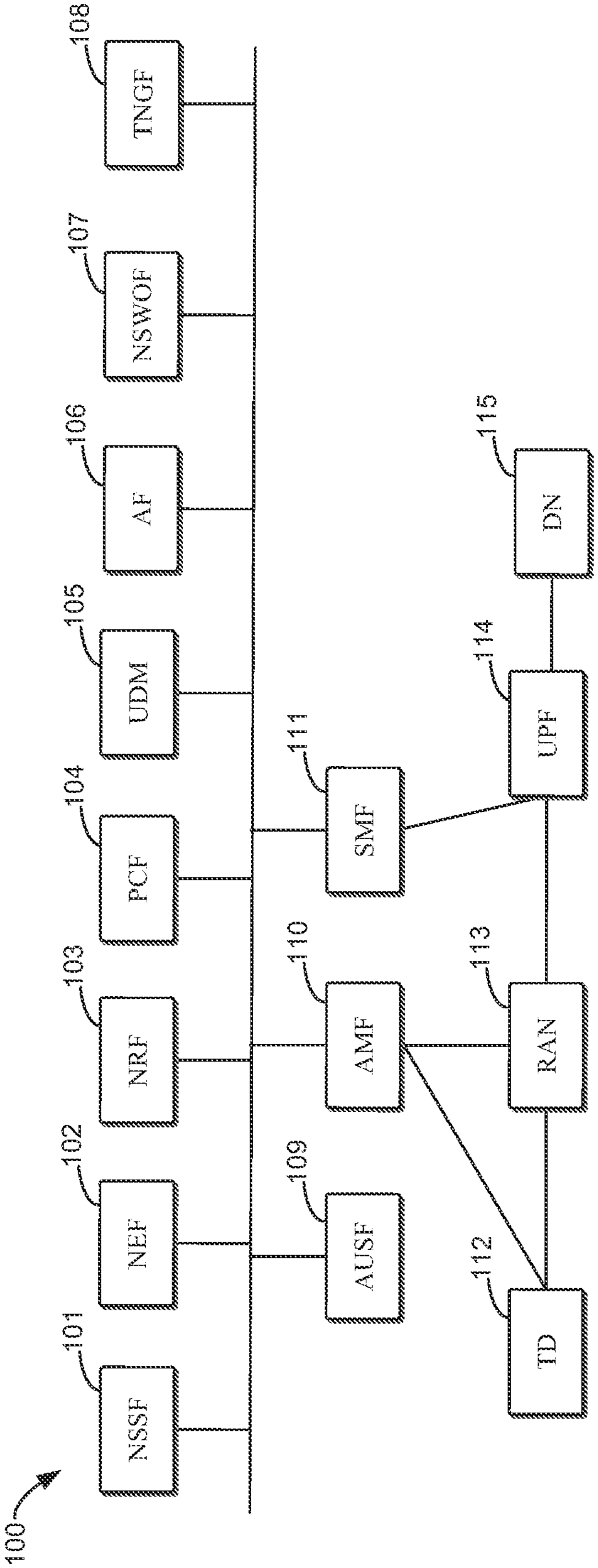
FIG. 1A illustrates an example of a network environment in which some example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(s) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network function" refers to a function in 5G core network, including at least one of Network Slice Selection Function (NSSF), Network Exposure Function (NEF), Network Repository Function (NRF), Policy Control Function (PCF), Unified Data Management (UDM), Application Function (AF), Non-seamless wireless local area network offload network function (NSWOF), trusted non-3GPP gateway function (TNGF), Authentication Server Function (AUSF), Access and Mobility Management Function (AMF), Session Management Function (SMF), and User Plane Function (UPF).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal" may be used interchangeably.

NSWO is based on the principle that a terminal device connects to a WLAN network and authenticates with an authentication procedure with an AUSF via a NSWOF. After the successful authentication, the terminal device is not registered in the 3GPP network at this point in time and has no NAS or user plane connectivity to the 5GC. However, if the terminal device wants to perform a 5G registration via this WLAN at a later time, assuming the WLAN broadcasts a 5GC connectivity, then the UE must first disconnect from the WLAN and then reconnect to the WLAN using the 5G registration via trusted non-3GPP access procedure. Such registration and access procedures of the terminal device may need to be optimized.

Disconnecting from the WLAN and then reconnecting to the same WLAN in order to perform 5G registration is not a good behavior, since the service needs to be interrupted. It is noted that the above mentioned WLAN network and the trusted Non-3GPP access network are just two examples of networks between which a terminal device may need to switch over. It is thus understood that if a terminal device is to switch between any two or more networks, there may be similar problems to that discussed above with reference to the WLAN network and the trusted Non-3GPP access network.

Example embodiments of the present disclosure provide a mechanism to solve the above discussed issues. The inventor finds that if the terminal device connects to a first network (for example, a WLAN network) based on a first authentication mechanism, such as the NSWO authentication; then the terminal device can perform a registration with a second network (for example, the trusted Non-3GPP access 5G registration) via this first network later, without having to disconnect and then re-connect to the first network again. This way, the service may not be interrupted through the example embodiments of the present disclosure. More particularly, some example embodiments of the present disclosure can simplify the process of trusted Non-3GPP access 5G registration, without interruption of the services. Principles and some example embodiments of the present disclosure will be described in detail below with reference to the accompanying drawings.

FIG. 1A illustrates an example of a network environment in which some example embodiments of the present disclosure may be implemented. In the descriptions of the example embodiments of the present disclosure, the network environment 100 may also be referred to as a communication system 100 (for example, a portion of a communication network). For illustrative purposes only, various aspects of example embodiments will be described in the context of one or more core network devices, access network devices, and terminal devices that communicate with one another. It should be appreciated, however, that the description herein may be applicable to other types of apparatus or other similar apparatuses that are referenced using other terminology.

The communication system 100 includes 5G core network functions NSSF 101, NEF 102, NRF 103, PCF 104, UDM 105, AF 106, NSWOF 107, TNGF 108, AUSF 109, AMF 110, SMF 111, UPF 114. The communication system 100 also includes a terminal device (TD) 112, a radio access network (RAN) 113, and a data network (DN) 115. According to example embodiments of the present disclosure, some network functions are directly related with the present disclosure, such as the TNGF 108, NSWOF 107, AMF 110, and AUSF 109. Those skilled in the art can understand that other network functions such as AMF 110 can also work in the switching process or after the switching.

Figure 1B:
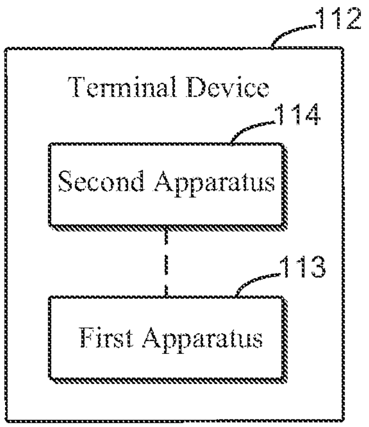
FIG. 1B illustrates an example of is a block schematic diagram, illustrating a first apparatus and a second apparatus of a terminal device in accordance some example embodiments of the present disclosure may be implemented.

FIG. 1B illustrates an example of is a block schematic diagram, illustrating a first apparatus and a second apparatus of a terminal device in accordance some example embodiments of the present disclosure may be implemented.

FIG. 1B shows a terminal device 112, which consists of several parts or components that altogether enables the users of the terminal device 112 to access the services provided by the network. In this description of the present disclosure, one may be mainly interested in distinguishing between two parts on a high level, namely a first apparatus 113, or a Universal Subscriber Identity Module (USIM), and a second apparatus 114, or a Mobile Equipment (ME). FIG. 1B illustrates a high level distinction of these parts of a terminal device 112.

First, the USIM part comprises a special software application that provides various functions like providing identifier and authentication of the user's subscription, security key generations, etc. The USIM comprises a tamper resistant secure hardware component, e.g., Universal Integrated Circuit Card (UICC). Second, the ME part denotes the wireless device comprising of hardware and software needed to communicate with the network. The ME may for example be a mobile phone, or smart phone, which can obtain network service when a USIM is inserted into it.

Figure 1C:
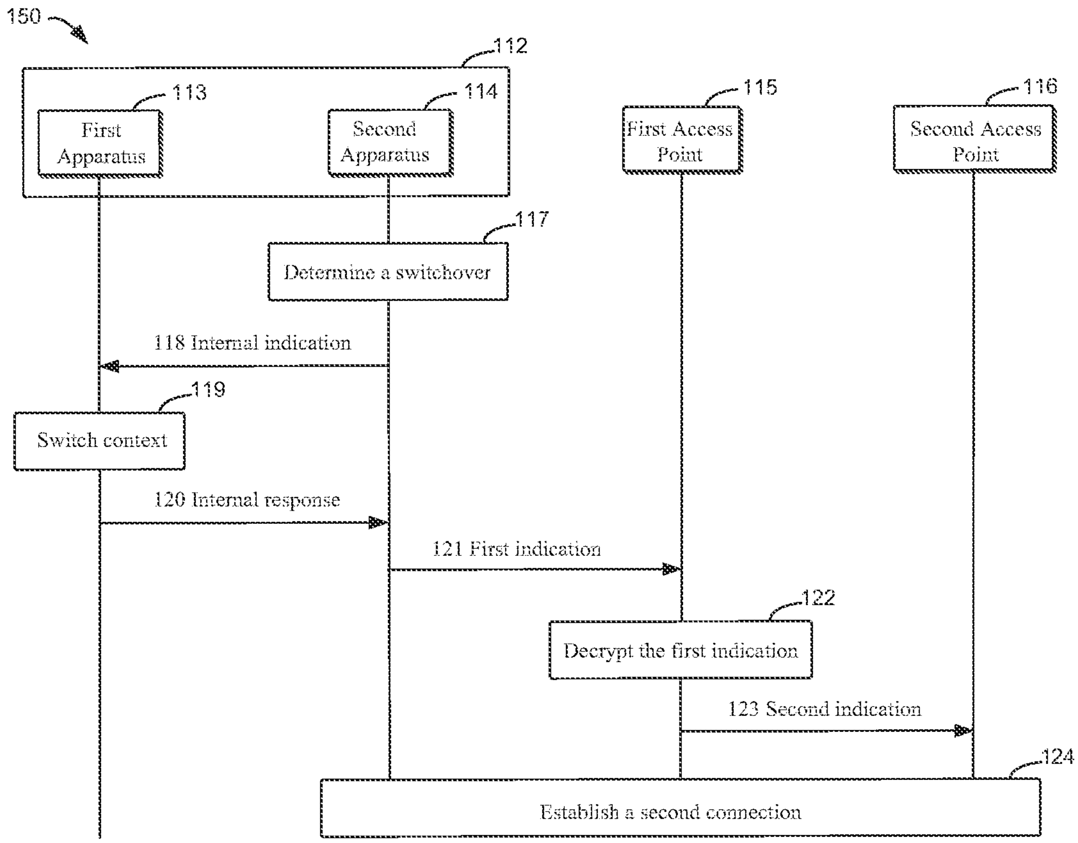
FIG. 1C illustrates an example of a process flow for switching over without disconnection of access network device in accordance with some example embodiments of the present disclosure.

FIG. 1C illustrates an example of a process flow for switching over without disconnection of access network device in accordance with some example embodiments of the present disclosure.

According to example embodiments of the present disclosure, in the process flow 150, the terminal device 112 comprises a first apparatus 113 and a second apparatus 114. The first apparatus may be a USIM, and the second apparatus may be a ME. A first access point 115 may be a WLAN AP, and a second access point 116 may be a trusted non-3GPP access point (TNAP).

According to example embodiments of the present disclosure, in step 117, the second apparatus 114 determines a switchover from a first traffic associated with the first access point 115 to a second traffic associated with the second access point 116. The ME determines a switchover from a NSWO WLAN offload traffic associated with the WLAN AP to a TNAP traffic associated with the TNAP. In step 118, the second apparatus 114 sends an internal indication of the switchover to the first apparatus 113 of the terminal device separable from the second apparatus 114. The ME sends a GET IDENTITY message with "NSWO switch over indication" to the USIM. In step 119, the first apparatus 113 switches from a first context associated with the first traffic to a second context associated with the second traffic. The USIM switches the context from "SUCI 5G NSWO context" to "SUCI context". In step 120, the first apparatus 113 sends a response to the second apparatus 114 to indicate that the switching is completed. The USIM sends response with SUCI associated with the TNAP to the ME. In step 121, the second apparatus 114 transmits a first indication of the switchover to the first access point 115, the indication being protected by a first key for a first connection between the terminal device and the first access point. The ME transmits a layer two (L2) message to the WLAN AP. The L2 message contains AN-parameters, NAS packet data unit (NAS-PDU), and "NSWO switch over indication" protected by WLAN keys. In step 122, the first access point 115 decrypts the first indication based on the first key to determine a switchover by the terminal device from a first traffic associated with the first access point to a second traffic associated with a second access point. The WLAN AP decrypts the L2 message. In step 123, the first access point 115 transmits a second indication of the switchover to the second access point 116. The WLAN AP transmits the content of the decrypted L2 message to the TNAP. In step 124, establish a second connection between the terminal device and the second access point, the second connection being protected by a second key. Based on a TNAP key, a trusted non-3GPP access authentication is performed among the USIM, the ME, the WLAN AP, the TNAP.

Figure 2:
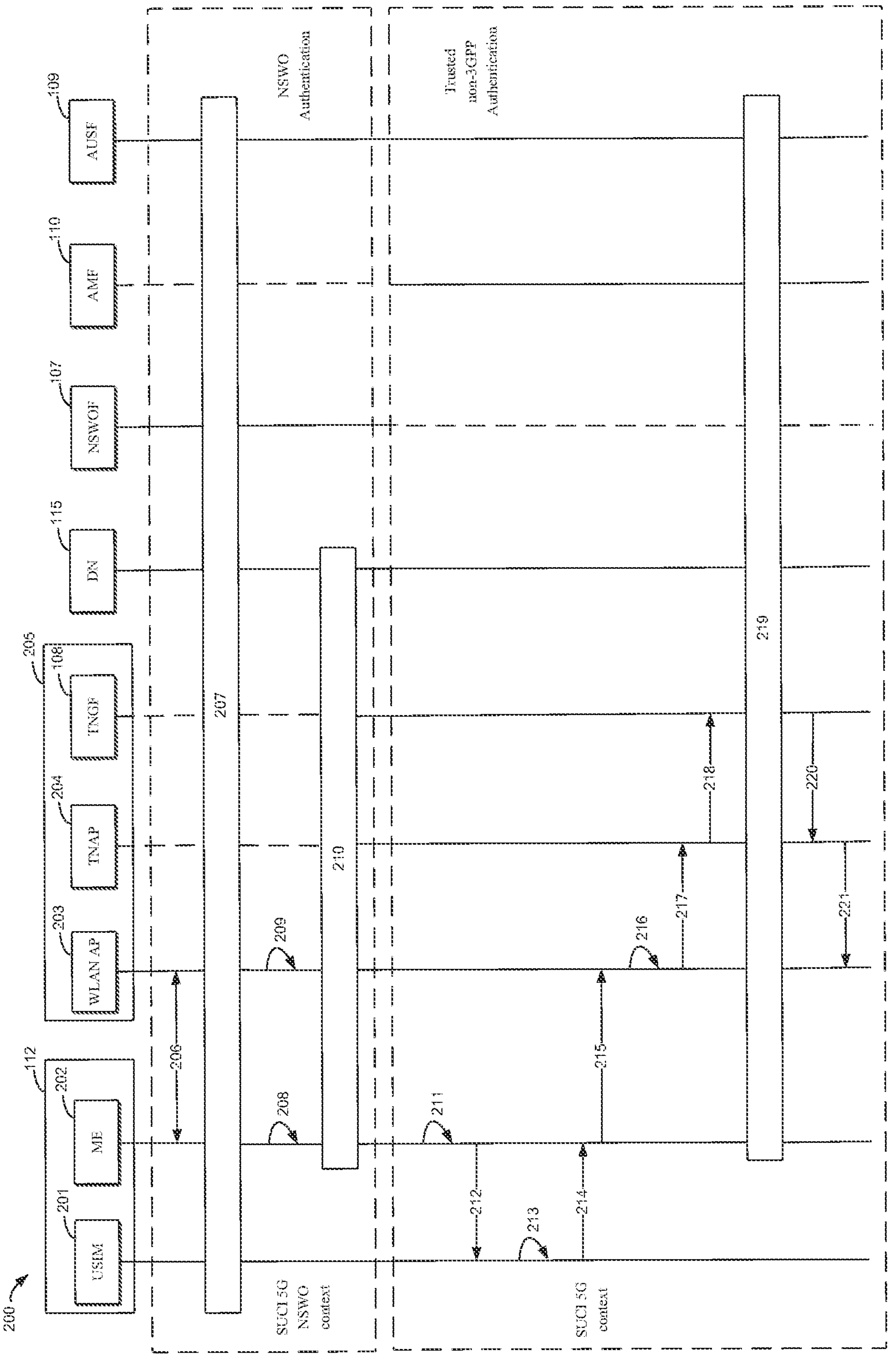
FIG. 2 illustrates an example of a process flow for switching over without disconnection of access network device in accordance with some example embodiments of the present disclosure.

FIG. 2 illustrates an example of a process flow for switching over without disconnection of access network device in accordance with some example embodiments of the present disclosure.

According to example embodiments of the present disclosure, the TD 112 comprises a first apparatus and a second apparatus, or a USIM 201 and a ME 202. A first access point, or a WLAN AP 203, a second access point, or a TNAP 204 and the TNGF 108 may be implement in a same device 205. WLAN AP 203 and TNAP 204 are associated with the RAN 113 in FIG. 1A.

According to example embodiments of the present disclosure, in step 206, The TD 112 establishes a WLAN connection between the ME 202 and the WLAN AP 203, using procedures such as specified in IEEE 802.11. Step 207 is a NSWO authentication. After successful NSWO authentication, in step 208, the ME 202 derives WLAN keys from a master key. in step 209, the WLAN AP 203 derives the WLAN keys from the master key. In step 210, the TD 112 connects to WLAN access, route specific IP flows via the WLAN access without traversing the 3GPP core network. This way, the service is offloaded to the WLAN. Steps 206, 207, 208, 209, 210 are with NSWO authentication, and the USIM 201 uses Subscription Concealed Identifier (SUCI) 5G NSWO context.

According to example embodiments of the present disclosure, in step 211, the ME 202 determines a switchover from a first traffic associated with a first access point to a second traffic associated with a second access point. The ME 202 determines a switchover from a NSWO WLAN offload traffic associated with the WLAN AP 203 to a TNAP traffic associated with the TNAP 204, without disconnection and re-connecting again, where the TD 112 needs to be authenticated once again by a 5G system (5GS).

According to example embodiments of the present disclosure, in step 212, the second apparatus of the terminal device sends an internal indication of the switchover to a first apparatus of the terminal device separable from the second apparatus. The ME 202 sends a GET IDENTITY message with "NSWO switch over indication" to the USIM 201. In step 213, the first apparatus switches from a first context associated with the first traffic to a second context associated with the second traffic. The USIM 213 switches the context from "SUCI 5G NSWO context" to "SUCI context". In step 214, the first apparatus sends a response to the second apparatus of the terminal device to indicate that the switching is completed. The USIM 201 sends response with SUCI associated with the TNAP 204 to the ME 202.

According to example embodiments of the present disclosure, in step 215, the second apparatus transmits an indication of the switchover to the first access point, the indication being protected by a first key for a first connection between the terminal device and the first access point. The ME 202 transmits a layer two (L2) message to the WLAN AP 203. The L2 message contains AN-parameters, NAS packet data unit (NAS-PDU), and "NSWO switch over indication" protected by WLAN keys.

According to example embodiments of the present disclosure, in step 216, the first access point decrypts the first indication based on the first key to determine a switchover by the terminal device from a first traffic associated with the first access point to a second traffic associated with a second access point. The WLAN AP 203 decrypts the L2 message.

According to example embodiments of the present disclosure, in step 217, the first access point transmits a second indication of the switchover to the second access point. The WLAN AP 203 transmits the content of the decrypted L2 message to the TNAP 204.

According to example embodiments of the present disclosure, in step 218, the second access point forwards the second indication of the switchover to a gateway function. The TNAP 204 forwards the content of the decrypted L2 message to the TNGF 108.

According to example embodiments of the present disclosure, in step 219, establish a second connection between the terminal device and the second access point, the second connection being protected by a second key. Based on a TNAP key, a trusted non-3GPP access authentication is performed among the USIM 201, the ME 202, the WLAN AP 203, the TNAP 204, the TNGF 108, the DN 115, and a set of core network functions such as AMF 110 and AUSF 109. Optionally, after NAS connection is accepted, or Standalone Architecture (SA) has been established, the terminal device shall stop the WLAN key based message protection.

According to example embodiments of the present disclosure, in step 220, the gateway function transmits to the second access point, an indication of stopping encryption performed by the first access point for the terminal device. The TNGF 108 informs the WLAN AP 203 to stop the WLAN key based encryption because Internet Protocol Security (IPsec) based security has been established between the TD 112 and the TNGF 108. The indication is transmitted from the TNGF 108 to the TNAP 204 in step 220, then is forwarded to the WLAN AP 203 in step 221.

According to example embodiments of the present disclosure, according to the flow chart in FIG. 2, in case of switching over from NSWO to trusted non-3GPP access authentication, the ME 202 requests the USIM 201 for identity with "NSWO switch over indication". The USIM 201 switches from 5G NSWO SUCI context to non-NSWO context, which is SUCI 5G Context. All messages during trusted non-3GPP access authentication between the TD 112 and the WLAN AP 203 is protected with WLAN keys from previous NSWO authentication. Once TNGF is aware of the NSWO switchover case, Extensible Authentication Protocol (EAP) authentication for trusted non-3GPP access authentication starts as in clause 7A.2.1 in TS 33.501 v17.5.0.

Figure 3:
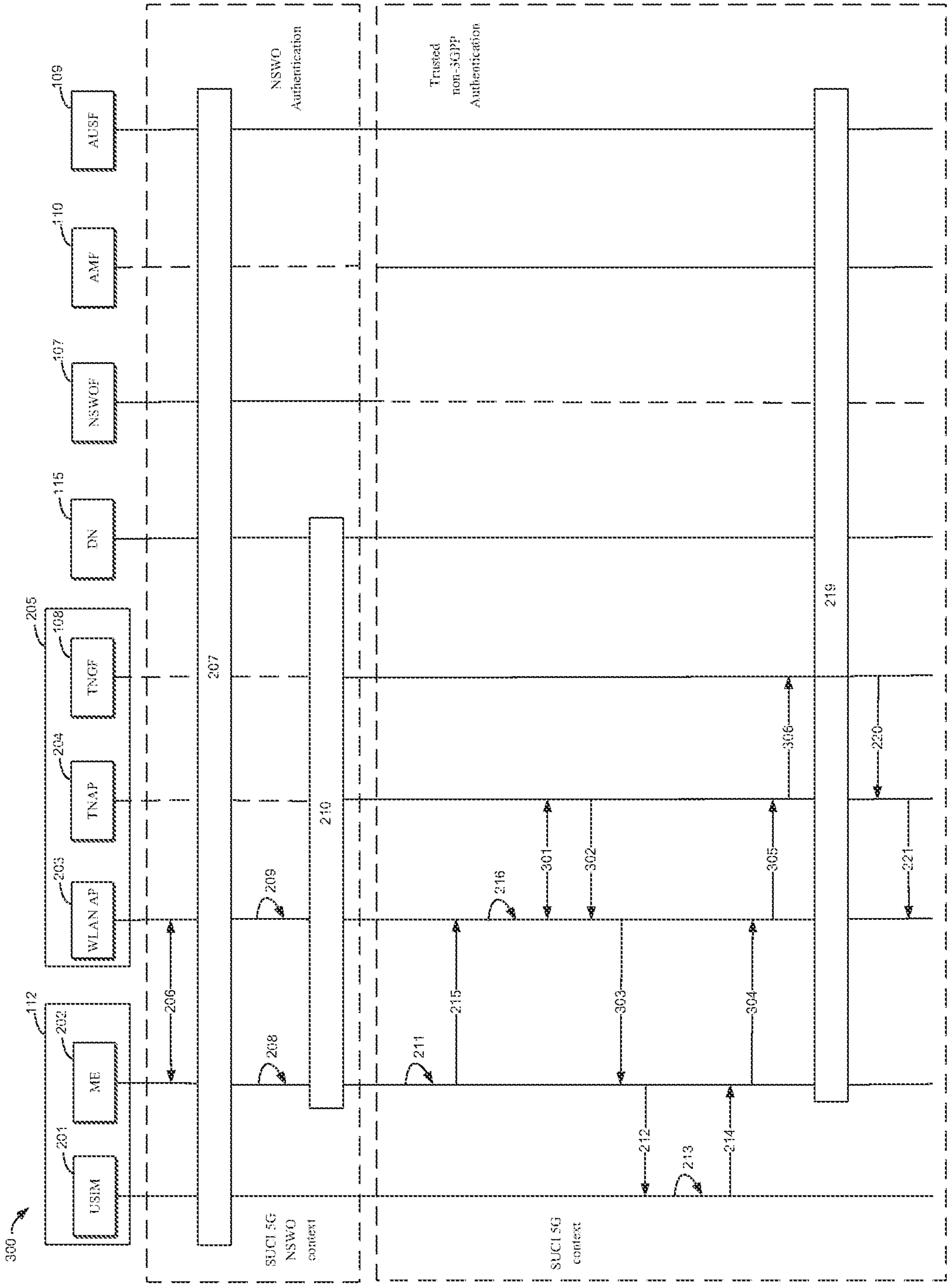
FIG. 3 illustrates an example of a process flow for switching over without disconnection of access network device in accordance with some example embodiments of the present disclosure.

FIG. 3 illustrates an example of a process flow for switching over without disconnection of access network device in accordance with some example embodiments of the present disclosure.

According to example embodiments of the present disclosure, the USIM 201, ME 202, WLAN AP 203, TNAP 204, TNGF 108, DN 115, NSWOF 107, AMF 110, and AUSF 109 in FIG. 3 are the same with those in FIG. 2, and steps 206, 207, 208, 209, 210, 211, 212, 213, 214, 215, 216, 219, 220, and 221 in FIG. 3 are the same with those in FIG. 2.

According to example embodiments of the present disclosure, in step 301, the first access point synchronizes with the second access point. The WLAN AP 203 synchronizes with the TNAP 204.

According to example embodiments of the present disclosure, in step 302, the second access point transmits an Extensible Authentication Protocol (EAP) request to the first access point. The TNAP 204 transmits an EAP request with identity to the WLAN AP 203. All messages between the WLAN AP 203 and the ME 202 are WLAN key protected, the WLAN keys are derived during NSWO. These keys will be used till new keys are derived in trusted non-3GPP access authentication keys derivation phase. In step 303, the WLAN AP 203 transmits the EAP request to the ME 202.

According to example embodiments of the present disclosure, in step 304, the second apparatus transmits an indication of the switchover to the first access point. The ME 202 transmits an EAP response with identity to the WLAN AP 203. In step 305 and 306, the EAP response is transmitted from the WLAN AP 203 to the TNAP 204, then to the TNGF 108.

According to example embodiments of the present disclosure, according to the flow chart in FIG. 3, in case of switching over from NSWO to trusted non-3GPP access authentication, the ME 202 informs about this switchover to the WLAN AP 203. The WLAN AP 203/TNAP 204 request for identity and the ME 202 fetches it from the USIM 201 and also the SUCI context is switched. Generated SUCI in Network Access Identifier (NAI) format is sent to the TNGF 108, and further request for EAP-5G will be triggered by the TNGF 108 towards the TD 112, as in clause 7A.2.1 in TS 33.501 v17.5.0.

Figure 4:
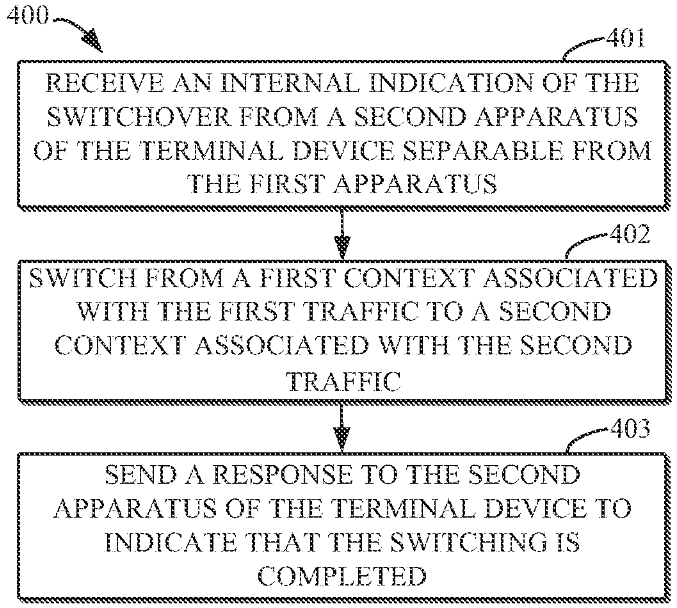
FIG. 4 illustrates an example of a method implemented at a first apparatus of a terminal device in accordance with some example embodiments of the present disclosure.

FIG. 4 illustrates an example of a method implemented at a first apparatus of a terminal device in accordance with some example embodiments of the present disclosure. For the purpose of discussion, the method 400 will be described from the perspective of the USIM 201 in the TD 112 with reference to FIG. 1A, FIG. 2, and FIG. 3.

At block 401, the first apparatus of the terminal device receives an internal indication of the switchover from a second apparatus of the terminal device separable from the first apparatus. At block 402, the first apparatus of the terminal device switches from a first context associated with the first traffic to a second context associated with the second traffic. At block 403, the first apparatus of the terminal device sends a response to the second apparatus of the terminal device to indicate that the switching is completed. In this manner, the first apparatus of the terminal device can switch from the first context to the second context, without disconnection with the access network, and without interrupt of the service.

In some embodiments, a first traffic is associated with a first access point. Alternatively or additionally, the second traffic is associated with a second access point. Alternatively or additionally, the first context comprises a subscription concealed identifier (SUCI) 5G non-seamless wireless local area network (WLAN) offload (NSWO) context. Alternatively or additionally, the second context comprises a SUCI context. Alternatively or additionally, the response comprises a SUCI associated with the second access point. This way, the first apparatus of the terminal device can switch from a NSWO context to a SUCI context, without disconnection with the access network, and without interrupt of the service.

In some embodiments, the first apparatus further establishes a second connection between the terminal device and the second access point. This way, the first apparatus of the terminal device can switch from the first connection to the second connection.

In some embodiments, the first apparatus comprises a Universal Subscriber Identity Module (USIM). Alternatively or additionally, the second apparatus of the terminal device comprises a mobile equipment (ME) module of the terminal device. Alternatively or additionally, the first access point comprises a WLAN access point (AP). Alternatively or additionally, the second access point comprises a trusted non-3GPP access point (TNAP). Alternatively or additionally, the first traffic comprises a NSWO traffic. Alternatively or additionally, the second traffic comprises a TNAP traffic. This way, the terminal device can switch from the NSWO traffic to the TNAP traffic, without disconnection with the access network, and without interrupt of the service.

Figure 5:
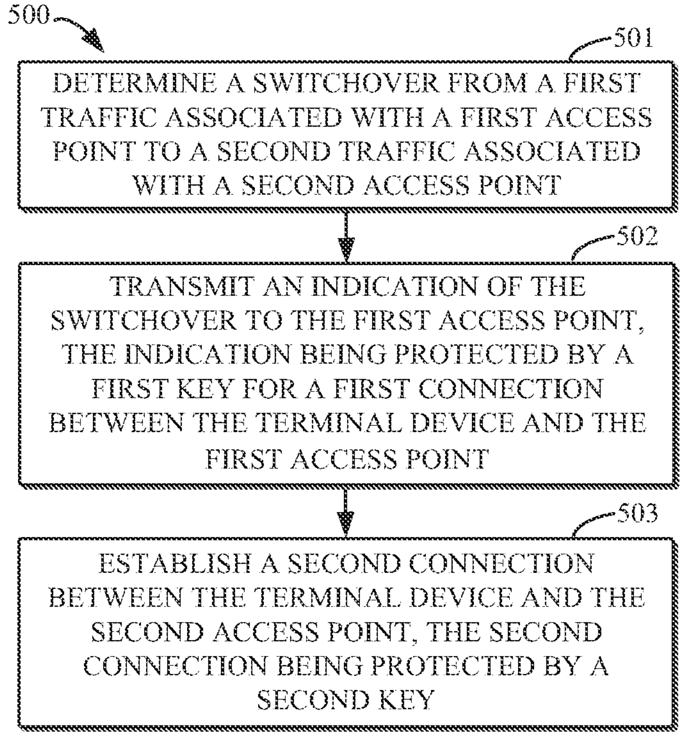
FIG. 5 illustrates an example of a method implemented at a second apparatus of a terminal device in accordance with some example embodiments of the present disclosure.

FIG. 5 illustrates an example of a method implemented at a second apparatus of a terminal device in accordance with some example embodiments of the present disclosure. For the purpose of discussion, the method 500 will be described from the perspective of ME 202 in the TD 112 with reference to FIG. 1A, FIG. 2, and FIG. 3.

At block 501, the second apparatus of the terminal device determines a switchover from a first traffic associated with a first access point to a second traffic associated with a second access point. At block 502, the second apparatus of the terminal device transmits an indication of the switchover to the first access point, the indication being protected by a first key for a first connection between the terminal device and the first access point. At block 503, the second apparatus of the terminal device establishes a second connection between the terminal device and the second access point, the second connection being protected by a second key. In this manner, the terminal device can switch from the first traffic to the second traffic, without disconnection with the access network, and without interrupt of the service.

In some embodiments, the second apparatus comprises a mobile equipment (ME) of the terminal device. Alternatively or additionally, the indication of the switchover is transmitted via a layer 2 (L2) message. This way, the terminal device can switch from the first traffic to the second traffic, without disconnection with the access network, and without interrupt of the service.

In some embodiments, the indication of the switchover comprises a non-seamless wireless local area network (WLAN) offload (NSWO) switch over indication. This way, the terminal can switch from the NSWO traffic to the TNAP traffic, without disconnection with the access network, and without interrupt of the service.

In some embodiments, the L2 message further comprises a non-access stratum (NAS) packet data unit (PDU). This way, service over NAS layer will not be interrupted.

In some embodiments, in order to establish the second connection, the second apparatus can perform, based on the second key, a trusted non-3GPP access authentication among a subscriber identity module of the terminal device, the ME module of the terminal device, the first access point, the second access point, a gateway function, a data network, and a set of core network functions. This way, the authentication of trusted non-3GPP access authentication can be completed, without disconnection of the access network, and without interruption of the service.

In some embodiments, the second apparatus may send an internal indication of the switchover to a first apparatus of the terminal device separable from the second apparatus. Then, the second apparatus can receive a response from the first apparatus of the terminal device to indicate that the switching is completed. This way, the second apparatus can make the first apparatus to switch from SUCI 5G NSWO context to SUCI 5G context, without disconnection with the access network.

In some embodiments, in order to send the internal indication, after transmitting the indication of the switchover to the first access point, the second apparatus may send the internal indication. This way, the second apparatus can inform the switchover to the first access point first, then request for indication from the first apparatus, without discussion of the access network.

In some embodiments, after receiving the response from the first apparatus, the second apparatus can transmit the indication of the switchover to the first access point. This way, the second apparatus can get the response of indication from the first apparatus first, then inform the switchover to the first access point, without discussion of the access network.

In some embodiments, the first apparatus comprises a Universal Subscriber Identity Module (USIM). Alternatively or additionally, the first access point comprises a wireless local area network access point (WLAN AP). Alternatively or additionally, the second access point comprises a trusted non-3GPP access point (TNAP). Alternatively or additionally, the first traffic comprises a NSWO traffic. Alternatively or additionally, the second traffic comprises a TNAP traffic. Alternatively or additionally, the first key comprises a WLAN key. Alternatively or additionally, the second key comprises a TNAP key. This way, the terminal device can switch from the NSWO traffic protected by the WLAN key to the TNAP traffic protected by the TNAP key, without discussion of the access network, and without service interruption.

Figure 6:
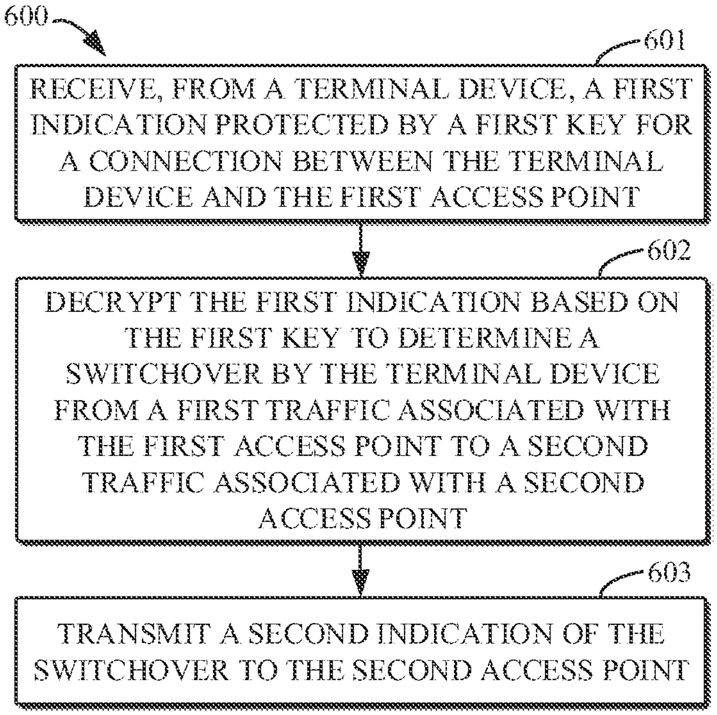
FIG. 6 illustrates an example of a method implemented at a first access point in accordance with some example embodiments of the present disclosure.

FIG. 6 illustrates an example of a method implemented at a first access point in accordance with some example embodiments of the present disclosure. For the purpose of discussion, the method 600 will be described from the perspective of WLAN AP 203 with reference to FIG. 1A, FIG. 2, and FIG. 3.

At block 601, the first access point receives, from a terminal device, a first indication protected by a first key for a connection between the terminal device and the first access point. At block 602, the first access point decrypts the first indication based on the first key to determine a switchover by the terminal device from a first traffic associated with the first access point to a second traffic associated with a second access point. At block 603, the first access point transmits a second indication of the switchover to the second access point. In this manner, the first access point can be informed to switch over from the first traffic to the second traffic, without discussion of the access network, and without service interruption.

In some embodiments, the second indication of the switchover comprises contents of the first indication. In this way, the content of the first indication can be got and transmitted to the second access point, to inform the switchover.

In some embodiments, the first access point can further synchronize with the second access point, receive an identity request from the second access point, send the identity request to a mobile equipment (ME) module of the terminal device, receive an identity response from the ME module of the terminal device, and send the identity response to the second access point. This way, the first access point can help to switch over from the first traffic to the second traffic with the terminal. And the terminal can keep connection in the switchover.

In some embodiments, the identity request comprises an Extensible Authentication Protocol (EAP) request. Alternatively or additionally, the identity response comprises an EAP response. This way, the identity request and response can be transmitted more reliably.

In some embodiments, the first access point may further perform, based on a second key, a trusted non-3GPP access authentication with a subscriber identity module of the terminal device, a mobile equipment (ME) module of the terminal device, the second access point, a gateway function, a data network, and a set of core network functions; and receive, from the second access point, an indication of stopping encryption performed by the first access point for the terminal device. This way, the first access point can complete the trusted non-3GPP access authentication process with a second key, and informs the terminal device to stop encryption with WLAN key.

In some embodiments, the second key comprises a TNAP key. Alternatively or additionally, and the gateway function comprises a trusted non-3GPP gateway function (TNGF). This way, the first access point can help to switch over from the first traffic to the second traffic with the terminal device. And the terminal device can keep connection with the access network in the switchover.

In some embodiments, the first access point comprises a wireless local area network access point (WLAN AP). Alternatively or additionally, the second access point comprises a trusted non-3GPP access point (TNAP). Alternatively or additionally, the first indication is transmitted via a layer 2 (L2) message. Alternatively or additionally, the first key comprises a WLAN key. This way, the terminal device can switch from a NSWO traffic to a TNAP traffic, and keep connection with the access network in switchover.

Figure 7:
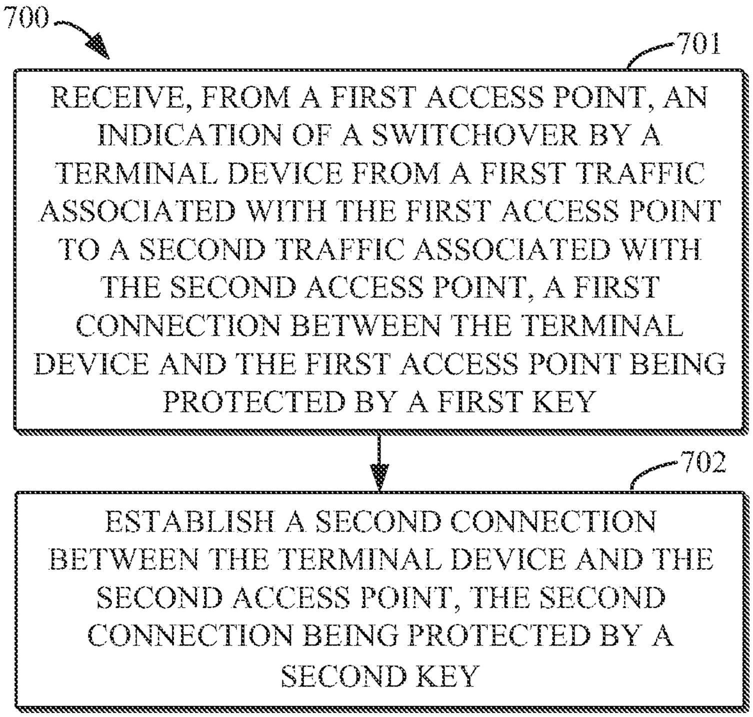
FIG. 7 illustrates an example of a method implemented at a second access point in accordance with some example embodiments of the present disclosure.

FIG. 7 illustrates an example of a method implemented at a second access point in accordance with some example embodiments of the present disclosure. For the purpose of discussion, the method 600 will be described from the perspective of TNAP 204 with reference to FIG. 1A, FIG. 2, and FIG. 3.

At block 701, the second access point receives, from a first access point, an indication of a switchover by a terminal device from a first traffic associated with the first access point to a second traffic associated with the second access point, a first connection between the terminal device and the first access point being protected by a first key. At block 702, the second access point establishes a second connection between the terminal device and the second access point, the second connection being protected by a second key. This way, the second access point can help the terminal device to switch from the first traffic to the second traffic, without disconnection of the access network.

In some embodiments, in order to establish the second connection, the second access point can perform, based on the second key, a trusted non-3GPP access authentication with a subscriber identity module of the terminal device, a mobile equipment (ME) module of the terminal device, the first access point, a gateway function, a data network, and a set of core network functions. This way, the second access point can complete the second connection with the terminal device, without disconnection with the access network.

In some embodiments, in order to establish the second connection, upon transmitting an indication of the switchover to a gateway function, the second access point can establish the second connection between the terminal device and the second access point. This way, the second access point can help the terminal device to establish the second connection, without disconnection with the access network.

In some embodiments, the second access point may further synchronize with the first access point, transmit an Extensible Authentication Protocol (EAP) request to the first access point, receive an EAP response from the first access point, and transmit the EAP response to a gateway function. In this manner, the switch over can be more reliable.

In some embodiments, the gateway function comprises a trusted non-3GPP gateway function (TNGF). This way, the second traffic can be established via the TNGF.

In some embodiments, for the sake of establishing the second connection, after transmitting the EAP response to the gateway function, the second access point may establish the second connection between the terminal device and the second access point. This way, the second traffic can be established more reliable.

In some embodiments, after establishing the second connection between the terminal device and the second access point, the second access point may receive, from a gateway function, an indication of stopping encryption performed by the first access point for the terminal device. Then, the second access point can transmit the indication to the first access point. This way, the second access point can inform the first access point to finish encryption with the first key.

In some embodiments, the first access point comprises a wireless local area network access point (WLAN AP). Alternatively or additionally, the second access point comprises a trusted non-3GPP access point (TNAP). Alternatively or additionally, the second key comprises a TNAP key. Alternatively or additionally, the indication of the switchover comprises layer 2 (L2) message contents. This way, the terminal device can switch from the NSWO traffic to the TNAP traffic, without disconnection of the access network, and without service interruption.

In some embodiments, an apparatus capable of performing the method 400 (for example, the first apparatus in the terminal device) may comprise means for receiving, an internal indication of the switchover from a second apparatus of the terminal device; and means for switching, from a first context associated with the first traffic to a second context associated with the second traffic; and means for sending, a response to the second apparatus of the terminal device to indicate that the switching is completed.

In some example embodiments, a first traffic is associated with a first access point, the second traffic is associated with a second access point. Alternatively or additionally, the first context comprises a subscription concealed identifier (SUCI) 5G non-seamless wireless local area network (WLAN) offload (NSWO) context. Alternatively or additionally, the second context comprises a SUCI context. Alternatively or additionally, the response comprises a SUCI associated with the second access point.

In some example embodiments, the apparatus further comprises: means for establishing a second connection between the terminal device and the second access point.

In some example embodiments, the apparatus comprises a Universal Subscriber Identity Module (USIM). Alternatively or additionally, the second apparatus of the terminal device comprises a mobile equipment (ME) module of the terminal device. Alternatively or additionally, the first access point comprises a WLAN access point (AP). Alternatively or additionally, the second access point comprises a trusted non-3GPP access point (TNAP). Alternatively or additionally, the first traffic comprises a NSWO traffic. Alternatively or additionally, the second traffic comprises a TNAP traffic.

In some embodiments, the apparatus further comprises means for performing other steps in some embodiments of the method 400. In some embodiments, the means comprises at least one processor; and at least one memory including computer program code, the at least one memory and computer program code configured to, with the at least one processor, cause the performance of the apparatus.

In some embodiments, an apparatus capable of performing the method 500 (for example, the second apparatus in the terminal device) may comprise means for determining, a switchover from a first traffic associated with a first access point to a second traffic associated with a second access point; means for transmitting, an indication of the switchover to the first access point, the indication being protected by a first key for a first connection between the terminal device and the first access point; and means for establishing a second connection between the terminal device and the second access point, the second connection being protected by a second key.

In some example embodiments, the apparatus comprises a mobile equipment (ME) of the terminal device. Alternatively or additionally, the indication of the switchover is transmitted via a layer 2 (L2) message.

In some example embodiments, the indication of the switchover comprises a non-seamless wireless local area network (WLAN) offload (NSWO) switch over indication.

In some example embodiments, the L2 message further comprises a non-access stratum (NAS) packet data unit (PDU).

In some example embodiments, the means for establishing the second connection comprises: means for performing, based on the second key, a trusted non-3GPP access authentication among a subscriber identity module of the terminal device, the ME module of the terminal device, the first access point, the second access point, a gateway function, a data network, and a set of core network functions.

In some example embodiments, the apparatus further comprises: means for sending an internal indication of the switchover to a first apparatus of the terminal device separable from the apparatus; and means for receiving a response from the first apparatus of the terminal device to indicate that the switching is completed.

In some example embodiments, the means for sending the internal indication comprises: means for in response to transmitting the indication of the switchover to the first access point, causing the apparatus to send the internal indication.

In some example embodiments, the apparatus further comprises: means for in response to receiving the response from the first apparatus, transmitting the indication of the switchover to the first access point.

In some example embodiments, the first apparatus comprises a Universal Subscriber Identity Module (USIM). Alternatively or additionally, the first access point comprises a wireless local area network access point (WLAN AP). Alternatively or additionally, the second access point comprises a trusted non-3GPP access point (TNAP). Alternatively or additionally, the first traffic comprises a NSWO traffic. Alternatively or additionally, the second traffic comprises a TNAP traffic. Alternatively or additionally, the first key comprises a WLAN key. Alternatively or additionally, the second key comprises a TNAP key.

In some embodiments, the apparatus further comprises means for performing other steps in some embodiments of the method 500. In some embodiments, the means comprises at least one processor; and at least one memory including computer program code, the at least one memory and computer program code configured to, with the at least one processor, cause the performance of the apparatus.

In some embodiments, an apparatus capable of performing the method 600 (for example, the first access point) may comprise means for receiving, from a terminal device, a first indication protected by a first key for a connection between the terminal device and the first access point; means for decrypting the first indication based on the first key to determine a switchover by the terminal device from a first traffic associated with the first access point to a second traffic associated with a second access point; and means for transmitting a second indication of switchover to the second access point.

In some example embodiments, the second indication of the switchover comprises contents of the first indication.

In some example embodiments, the apparatus further comprises: means for synchronizing with the second access point; receive an identity request from the second access point; means for sending the identity request to a mobile equipment (ME) module of the terminal device; means for receiving an identity response from the ME module of the terminal device; and means for sending the identity response to the second access point.

In some example embodiments, the identity request comprises an Extensible Authentication Protocol (EAP) request. Alternatively or additionally, the identity response comprises an EAP response.

In some example embodiments, the apparatus further comprises: means for performing, based on a second key, a trusted non-3GPP access authentication with a subscriber identity module of the terminal device, a mobile equipment (ME) module of the terminal device, the second access point, a gateway function, a data network, and a set of core network functions; and means for receiving, from the second access point, an indication of stopping encryption performed by the first access point for the terminal device.

In some example embodiments, the second key comprises a TNAP key. Alternatively or additionally, the gateway function comprises a trusted non-3GPP gateway function (TNGF).

In some example embodiments, the first access point comprises a wireless local area network access point (WLAN AP). Alternatively or additionally, the second access point comprises a trusted non-3GPP access point (TNAP). Alternatively or additionally, the first indication is transmitted via a layer 2 (L2) message. Alternatively or additionally, the first key comprises a WLAN key.

In some embodiments, the apparatus further comprises means for performing other steps in some embodiments of the method 600. In some embodiments, the means comprises at least one processor; and at least one memory including computer program code, the at least one memory and computer program code configured to, with the at least one processor, cause the performance of the apparatus.

In some embodiments, an apparatus capable of performing the method 700 (for example, the second access point) may comprise means for receiving, from a first access point, an indication of a switchover by a terminal device from a first traffic associated with the first access point to a second traffic associated with the second access point, a first connection between the terminal device and the first access point being protected by a first key; and means for establishing a second connection between the terminal device and the second access point, the second connection being protected by a second key.

In some example embodiments, the means for establishing the second connection comprises: means for performing, based on the second key, a trusted non-3GPP access authentication with a subscriber identity module of the terminal device, a mobile equipment (ME) module of the terminal device, the first access point, a gateway function, a data network, and a set of core network functions.

In some example embodiments, the means for establishing the second connection comprises: means for in response to transmitting an indication of the switchover to a gateway function, establishing the second connection between the terminal device and the second access point.

In some example embodiments, the apparatus further comprises: means for synchronizing with the first access point; means for transmitting an Extensible Authentication Protocol (EAP) request to the first access point; means for receiving an EAP response from the first access point; and means for transmitting the EAP response to a gateway function.

In some example embodiments, the gateway function comprises a trusted non-3GPP gateway function (TNGF).

In some example embodiments, the means for establishing the second connection comprises: means for in response to transmitting the EAP response to the gateway function, establishing the second connection between the terminal device and the second access point.

In some example embodiments, the apparatus further comprises: means for in response to establishing the second connection between the terminal device and the second access point, receiving, from a gateway function, an indication of stopping encryption performed by the first access point for the terminal device; and means for transmitting the indication to the first access point.

In some example embodiments, the first access point comprises a wireless local area network access point (WLAN AP). Alternatively or additionally, the second access point comprises a trusted non-3GPP access point (TNAP). Alternatively or additionally, the second key comprises a TNAP key. Alternatively or additionally, the indication of the switchover comprises layer 2 (L2) message contents.

In some embodiments, the apparatus further comprises means for performing other steps in some embodiments of the method 700. In some embodiments, the means comprises at least one processor; and at least one memory including computer program code, the at least one memory and computer program code configured to, with the at least one processor, cause the performance of the apparatus.

Figure 8:
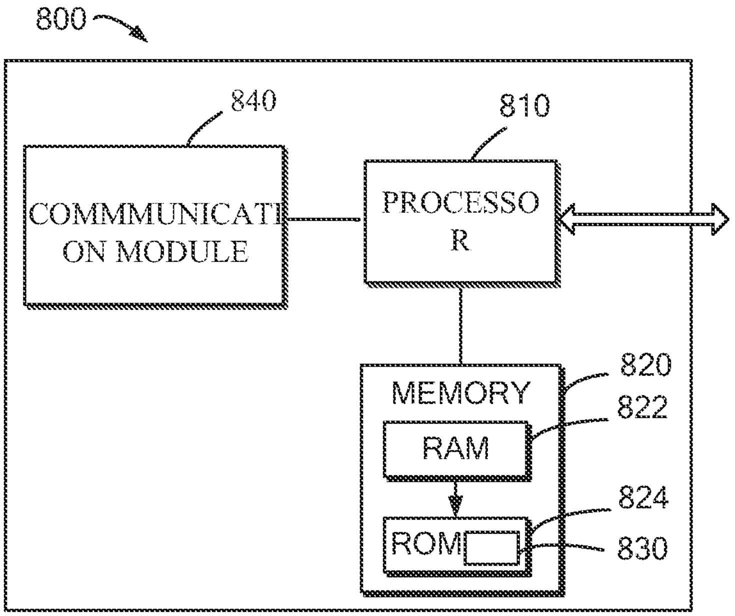
FIG. 8 illustrates a simplified block diagram of a device that is suitable for implementing some example embodiments of the present disclosure.

FIG. 8 illustrates a simplified block diagram of a device 800 that is suitable for implementing some example embodiments of the present disclosure. The device 800 may be provided to implement a communication device, for example, the WLAN AP 203, the TNAP 204, or the USIM 201, or ME 202 as shown in FIG. 2 or FIG. 3. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2 to 7. The embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like.

Figure 9:
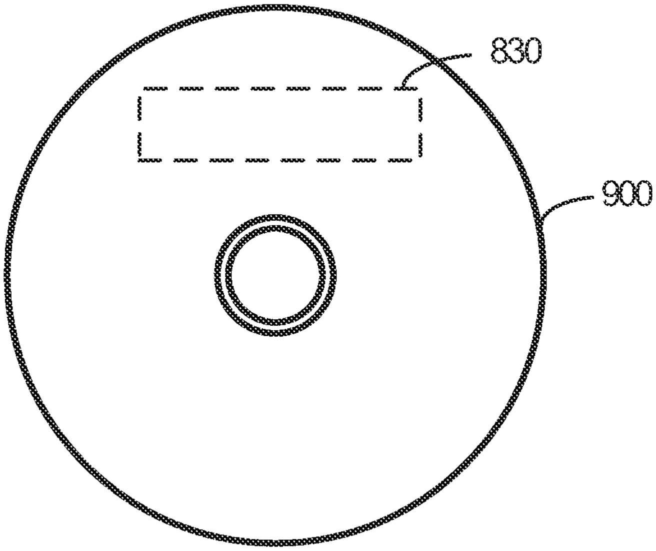
FIG. 9 illustrates a block diagram of an example of a computer readable medium in accordance with some example embodiments of the present disclosure.

FIG. 9 illustrates a block diagram of an example of a computer readable medium 2000 in accordance with some example embodiments of the present disclosure. The computer readable medium 900 has the program 830 stored thereon. It is noted that although the computer readable medium 900 is depicted in form of CD or DVD in FIG. 8, the computer readable medium 900 may be in any other form suitable for carry or hold the program 830.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400, 500, 600 or 700 as described above with reference to FIG. 4, 5, 6 or 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus of a terminal device, the first apparatus comprising a Universal Subscriber Identity Module (USIM) implemented on a Universal Integrated Circuit Card (UICC), the terminal device further comprising a mobile equipment (ME) separable from the USIM, the first apparatus further comprising:

at least one processor; and at least one memory storing instructions that, when executed by the at least one processor, cause the first apparatus at least to:

after the terminal device has established non-seamless wireless local area network offload (NSWO) traffic through a wireless local area network access point (WLAN AP) using NSWO authentication and while the terminal device remains connected to the WLAN AP without disconnecting from and reconnecting to the WLAN AP, receive an internal indication of a switchover from the ME, wherein the ME is separable from the first apparatus, the internal indication comprising a GET IDENTITY message comprising an NSWO switch over indication indicating the switchover from the NSWO traffic associated with the WLAN AP to trusted non-3GPP access point (TNAP) traffic associated with a TNAP;

in response to receiving the GET IDENTITY message comprising the NSWO switch over indication, switch from a first context associated with a first traffic type to a second context associated with a second traffic type, wherein the first context comprises a Subscription Concealed Identifier (SUCI) 5G NSWO context associated with the NSWO traffic, and wherein the second context comprises a SUCI context associated with the TNAP traffic; and send a response to the ME to indicate that the switching is completed, wherein the response comprises a SUCI associated with the TNAP and indicates that the switching from the SUCI 5G NSWO context to the SUCI context has been completed, wherein the SUCI included in the response is usable by the ME to transmit, to the WLAN AP, a layer two message comprising access network parameters, a non-access stratum packet data unit, and the NSWO switch over indication protected by one or more WLAN keys derived from the NSWO authentication, and wherein, after the switching from the SUCI 5G NSWO context to the SUCI context, the USIM participates in trusted non-3GPP access authentication for establishing a connection between the terminal device and the TNAP, the connection being protected by a TNAP key.

2. A second apparatus of a terminal device, the second apparatus comprising mobile equipment (ME) of the terminal device, the terminal device further comprising a first apparatus separable from the ME, the first apparatus comprising a Universal Subscriber Identity Module (USIM) implemented on a Universal Integrated Circuit Card (UICC), the second apparatus further comprising:

a processor;

a transceiver communicatively coupled to the processor, and at least one memory storing instructions that, when executed by the processor, cause the second apparatus at least to:

after the terminal device has established a wireless local area network (WLAN) connection between the ME and a WLAN access point (WLAN AP), completed non-seamless WLAN offload (NSWO) authentication for the WLAN connection, derived one or more WLAN keys from a master key generated during the NSWO authentication, and routed one or more Internet Protocol flows through WLAN access without traversing a 5G core network, determine, while maintaining the WLAN connection without disconnecting from and reconnecting to the WLAN AP, a switchover from NSWO WLAN offload traffic associated with the WLAN AP to a trusted non-3GPP access point (TNAP) traffic associated with a TNAP;

send, to the USIM, a GET IDENTITY message comprising an NSWO switch over indication indicating the switchover from the NSWO WLAN offload traffic to the TNAP traffic;

receive, from the USIM, a response to the GET IDENTITY message, the response comprising a Subscription Concealed Identifier (SUCI) associated with the TNAP and indicating that the USIM has switched from a SUCI 5G NSWO context associated with the NSWO WLAN offload traffic to a SUCI context associated with the TNAP traffic;

transmit an indication of the switchover to the first access point, wherein transmitting the indication comprises transmitting, using the transceiver and without disconnecting from the WLAN AP, a layer two message to the WLAN AP, the layer two message comprising access network parameters, a non-access stratum packet data unit generated using the SUCI associated with the TNAP, and the NSWO switch over indication, the indication being protected by one or more WLAN keys derived from the master key generated during the NSWO authentication for the WLAN connection between the ME and the WLAN AP;

cause, by the layer two message, the WLAN AP to decrypt the layer two message using the one or more WLAN keys and to transmit contents of the decrypted layer two message to the TNAP for forwarding to a trusted non-3GPP gateway function (TNGF); and establish a second connection between the terminal device and the second access point by participating in trusted non-3GPP access authentication with the USIM, the WLAN AP, the TNAP, the TNGF, an Access and Mobility Management Function (AMF), and an Authentication Server Function (AUSF), the second connection being protected by a TNAP key derived during the trusted non-3GPP access authentication.

3. The second apparatus of claim 2, wherein the WLAN connection between the ME and the WLAN AP is established using one or more IEEE 802.11 procedures before completion of the NSWO authentication.

4. The second apparatus of claim 3, wherein the NSWO authentication comprises authentication with an Authentication Server Function (AUSF) through a non-seamless WLAN offload network function (NSWOF).

5. The second apparatus of claim 4, wherein, before determining the switchover, the terminal device is not registered with a 5G core network and has no non-access stratum connectivity or user plane connectivity to the 5G core network for the one or more Internet Protocol flows routed through the WLAN access.

6. The second apparatus of claim 5, wherein the SUCI associated with the TNAP is generated in a Network Access Identifier (NAI) format for transmission toward the TNGF through the WLAN AP and the TNAP.

7. The second apparatus of claim 6, wherein the WLAN AP, the TNAP, and the TNGF are implemented in a same network device.

8. The second apparatus of claim 7, wherein the instructions, when executed by the processor, cause the second apparatus to receive, from the WLAN AP, an Extensible Authentication Protocol (EAP) request with identity that originated from the TNAP, and transmit, to the WLAN AP, an EAP response with identity comprising the SUCI associated with the TNAP for forwarding from the WLAN AP to the TNAP and from the TNAP to the TNGF.

9. The second apparatus of claim 8, wherein the EAP request with identity and the EAP response with identity are protected between the ME and the WLAN AP using the one or more WLAN keys derived from the master key generated during the NSWO authentication.

10. The second apparatus of claim 9, wherein the one or more WLAN keys are used to protect messages between the ME and the WLAN AP during the trusted non-3GPP access authentication until one or more new keys are derived during a trusted non-3GPP access authentication key derivation phase.

11. The second apparatus of claim 10, wherein the instructions, when executed by the processor, cause the second apparatus to stop using WLAN-key-based message protection after a non-access stratum connection is accepted or after a standalone architecture has been established for the trusted non-3GPP access authentication.

12. The second apparatus of claim 11, wherein the trusted non-3GPP access authentication comprises EAP-5G authentication triggered by the TNGF after the TNGF receives the contents of the decrypted layer two message from the TNAP.

* * * * *